United States Patent
Mai

(10) Patent No.: US 7,212,938 B2
(45) Date of Patent: May 1, 2007

(54) METHOD OF USING A SELF-LOCKING TRAVEL PATTERN TO ACHIEVE CALIBRATION OF REMOTE SENSORS USING CONVENTIONALLY COLLECTED DATA

(75) Inventor: Tuy Vu Mai, Houston, TX (US)

(73) Assignee: M7 Visual Intelligence, LP, San Antonio, TX (US)

( * ) Notice: Subject to any disclaimer, the term of this patent is extended or adjusted under 35 U.S.C. 154(b) by 357 days.

(21) Appl. No.: 10/244,980

(22) Filed: Sep. 17, 2002

(65) Prior Publication Data

US 2004/0054488 A1    Mar. 18, 2004

(51) Int. Cl.
*G01C 19/00*    (2006.01)

(52) U.S. Cl. .................................... 702/104

(58) Field of Classification Search ............... 702/104, 702/40; 244/3.14, 3.24; 250/334, 226, 330, 250/214 VT; 340/968; 342/25, 46, 55, 357.17; 348/31; 382/103; 356/5.09, 2, 5.04; 73/170, 73/12; 701/3, 213; 89/1.13
See application file for complete search history.

(56) References Cited

U.S. PATENT DOCUMENTS

| | | | | |
|---|---|---|---|---|
| 4,313,678 A | * | 2/1982 | Colvocoresses | 356/2 |
| 4,398,195 A | * | 8/1983 | Dano | 342/46 |
| 4,583,703 A | * | 4/1986 | Kline | 244/3.24 |
| 4,712,010 A | * | 12/1987 | Alm | 250/334 |
| 4,964,721 A | * | 10/1990 | Ulich et al. | 356/5.04 |
| 4,965,572 A | * | 10/1990 | Adamson | 340/968 |
| 5,013,917 A | * | 5/1991 | Ulich | 250/330 |
| 5,166,789 A | * | 11/1992 | Myrick | 348/144 |
| 5,198,657 A | * | 3/1993 | Trost et al. | 250/214 VT |
| 5,231,401 A | * | 7/1993 | Kaman et al. | 342/55 |
| 5,266,799 A | * | 11/1993 | Steinitz et al. | 250/253 |
| 5,276,321 A | * | 1/1994 | Chang et al. | 250/226 |
| 5,308,022 A | * | 5/1994 | Cronkhite et al. | 244/3.14 |
| 5,371,358 A | * | 12/1994 | Chang et al. | 250/226 |
| 5,448,936 A | * | 9/1995 | Turner | 89/1.13 |
| 5,450,125 A | * | 9/1995 | Ulich et al. | 348/31 |
| 5,596,494 A | | 1/1997 | Kuo | |
| 5,639,964 A | * | 6/1997 | Djorup | 73/170.12 |
| 5,894,323 A | | 4/1999 | Kain et al. | |
| 6,087,984 A | * | 7/2000 | Keller et al. | 342/357.17 |
| 6,204,799 B1 | * | 3/2001 | Caputi, Jr. | 342/25 |
| 6,282,301 B1 | * | 8/2001 | Haskett | 382/103 |

(Continued)

OTHER PUBLICATIONS

Nicholas M. Short, Sr. (2002) "The Remote Sensing Tutorial" http://rst.gsfc.nasa.gov, NASA—Goddard Space Flight Center.

*Primary Examiner*—John E. Barlow, Jr.
*Assistant Examiner*—Aditya Bhat
(74) *Attorney, Agent, or Firm*—Jennifer S. Sickler; Jason P. Sander; Gardere Wynne Sewell LLP

(57) ABSTRACT

The present invention provides a method to calibrate an on-board remote sensing system using a self-locking travel pattern and target remote sensing data. The self-locking travel pattern includes a number of parallel travel lines having overlapping swath widths between adjacent travel lines. The overlapping swath widths are used to determine the boresight angles and range offset of the remote sensor device. In addition, the method can be used to generate estimated horizontal and vertical displacement errors. These estimated errors can be used as correction factors for the range offset and boresight angles.

24 Claims, 5 Drawing Sheets

U.S. PATENT DOCUMENTS

| | | | |
|---|---|---|---|
| 6,353,409 B1 * | 3/2002 | Keller et al. | 342/357.17 |
| 6,542,831 B1 * | 4/2003 | Moosmuller et al. | 702/40 |
| 6,553,311 B2 * | 4/2003 | Ahearn et al. | 701/213 |
| 6,711,475 B2 * | 3/2004 | Murphy | 701/3 |

* cited by examiner

METHOD OF USING A SELF-LOCKING TRAVEL PATTERN TO ACHIEVE CALIBRATION OF REMOTE SENSORS USING CONVENTIONALLY COLLECTED DATA

FIELD OF THE INVENTION

This invention relates generally to the field of imaging using remote sensors. More specifically, this invention relates to a method of calibrating a vehicle-mounted remote sensor device using remote sensing data collected during conventional operation of the vehicle.

BACKGROUND OF THE INVENTION

Remote sensing involves the acquisition of information or data around a distant object or system without being in physical contact with it. Most remote sensing instruments are designed to analyze the characteristics of the electromagnetic spectra reflected by objects (their spectral signatures) to allow one to determine some of the objects' properties. Human vision uses the same principle when using color (the sensation produced when light of different wavelengths falls on the human eye) to identify objects. The sensors used in remote sensing, however, make it possible to broaden the field of analysis to include parts of the electromagnetic spectrum that are well beyond visible light such as ultraviolet (<0.3 μm), visible (0.4–0.7 μm), near-infrared (0.7–1.5 μm) and thermal infrared (up to 1000 μm or 1 mm) ranges.

Today, remote sensing technology is used in a variety of applications in fields such as hydrology, geology, environment, transportation, ecology, and earthquake engineering. One particular application involves airborne imaging where remote sensors are placed on-board aircraft to make observations and images of the Earth. These airborne remote sensor systems generally use either a mechanical scanning technique or a linear array, along with aircraft motion, to acquire terrestrial imagery.

One drawback to using current airborne imaging techniques is the inferior geometric fidelity in image quality since the two-dimensional spatial images captured by the remote sensors are not acquired at the same instant. During airborne imaging, each image scene that is collected from a target area consists of a two-dimensional grid of discrete cells, each of which is referred to as a pixel. For scanning sensors, adjacent pixels are acquired at different times, while for linear array sensors, adjacent rows of pixels are acquired at different times. Attitude data meanwhile are sampled once per scan revolution. Consequently, any changes in the direction of the aircraft's velocity or attitude results in geometric distortions for different regions within the two-dimensional image. Also, sufficient information is not available to obtain accurate records of the sensor's location or its attitude parameters at the appropriate instant. Therefore, the collected data requires sophisticated and expensive post-mission processing to improve upon the geometric fidelity and to achieve a positioning accuracy that meet the user's requirement.

Another drawback to current airborne imaging is that the remote sensors mounted to the aircraft have to be calibrated in order to accurately obtain the absolute geophysical coordinates of the remote sensing data. During normal operation, the remote sensing data acquired during the flight must be transferred from the original mission medium to a working medium. The remote sensing data is then processed in a centrally located data processing center before it is distributed to end users. To obtain the desired level of accuracy on the absolute geophysical coordinates, each user has to perform additional image processing. This includes sophisticated and extensive ground processing and, in many cases, collecting supporting data on ground control points before the absolute geophysical coordinates on any feature in the terrestrial imagery can be obtained. No accurate absolute geophysical coordinate information, suitable for medium and large scale mapping applications, of any terrestrial features in an image scene is available on the original mission medium.

One method of calibrating a remote sensor is to place calibration targets on the target area that is to be sensed. Panels made of cloth have been used as calibration targets but are expensive, difficult to handle, require intensive effort to lay out in a field, are easily damaged, and usually must be gathered up after the calibration exposure is completed. In addition, deploying calibration targets requires significant labor costs when sites are remote or when images must be acquired frequently. Another calibration target is described in U.S. Pat. No. 6,191,851 (Kirkham et al.). Kirkham et al. discloses a calibration target that can be left in place adjacent to or in the field of interest to permit automatic calibration of the remote sensing system. However, the calibration target must still be deployed in or near the area to be imaged to provide the imagery characteristics of the target area in order to calibrate the data received by the remote sensor.

Accordingly, there is a need in the art of remote sensor technology to provide an inexpensive calibration method that can provide optical and thermal imagery characteristics without having to perform multiple calibration flights or travel during airborne or vehicular imaging applications. The aspects for cost reduction include equipment and material cost, mission execution and verification process, reduction of ground support tasks, efficiency and accessibility of deriving accurate position information from remotely sensed images.

SUMMARY OF THE INVENTION

The present invention provides a method of calibrating a remote sensing system employed in a vehicle, such as an aircraft, using remote sensing data collected during conventional vehicle operation. The method includes mounting at least one remote sensor on a vehicle and moving the vehicle in a self-locking pattern over a target area, the movement comprising any pattern that produces at least three substantially parallel travel lines out of a group of three or more lines, at least one of which travel lines is in an opposing direction to the other substantially parallel travel lines. Swath widths are generated for each substantially parallel travel line with the remote sensor device. Remote sensing data is collected of the target area during vehicle movement, which is inputted into a computer to calculate calibration data. The calibration data is applied to the remote sensing data to remove bias in image output.

The present method further includes mounting at least one remote sensor device on an aircraft to generate remote sensing data of a target area below. The method uses a self-locking flight pattern having a number of parallel flight lines arranged so that an individual flight line has one adjacent flight line oriented in a matching direction and the other adjacent flight line oriented in an opposite or crossing direction. Additional flight lines outside the target area of interest can be added to the left and right boundary of the target area. These extra outer-boundary lines are not themselves required, but are present to ensure each flight line in the target area of interest has two adjacent lines. A computer is used post-process to determine the boresight angles, and the range offset, if needed, of the remote sensor device using overlapped areas of adjacent parallel flight lines. The computed boresight angles and range offset can be applied to remove bias in the final image output.

In addition, the present invention further includes a method to generate an estimated horizontal displacement error and vertical displacement error using parallax values found in the overlapped areas of adjacent flight lines. The estimated horizontal displacement error is the standard deviation of the horizontal displacement errors of a sample of objects having images separated by a certain distance in the overlapped areas. The vertical displacement error is the standard deviation of a sampling of vertical displacement errors; the sampling taken so that each flight line contributes the same number of objects spread evenly along the flight line.

The present invention also provides a remote sensing system utilizing the above calibration method. The remote sensing system includes a remote sensor device, an aircraft flying in a self-locking flight pattern and a computer adapted to generate calibration data.

DETAILED DESCRIPTION

Figure 1:
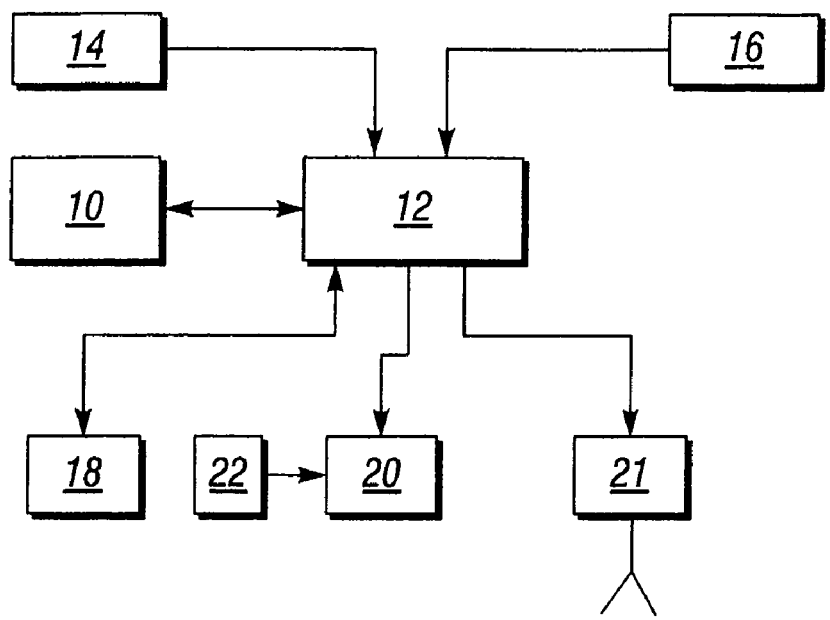
FIG. 1 depicts a block diagram of the on-board remote sensing system of a preferred embodiment of the present invention.

The present invention provides a method of calibrating remote sensors using remote sensing data collected during conventional operation of a vehicle. FIG. 1 depicts an aircraft on-board remote sensing system that can utilize a preferred embodiment of the method of the present invention. The on-board remote sensing system has at least one remote sensor device 10 that is designed to obtain data of a site flown over by an aircraft. The remote sensor device 10 is associated with a computer 12 suited to form, select and correct images of the site flown over. The computer 12 is connected to a positioning device 14 to allow continuous association of geographic data with the images acquired. The computer 12 can also be connected to an attitude-sensing device 16 whose indications allow readjustment of the images acquired according to the trajectory of the aircraft. The on-board system can further comprise a memory unit 18 and navigation guidance system 20 to provide immediate feedback to the pilot as to the position of the aircraft relative to the planned flight lines. This system receives position data from real-time positioning device 22 that can include a differential GPS unit. In addition, the computer 12 can also be coupled to a communications network 21 to permit direct transmission of data to locations remote from computer 12.

Figure 2:
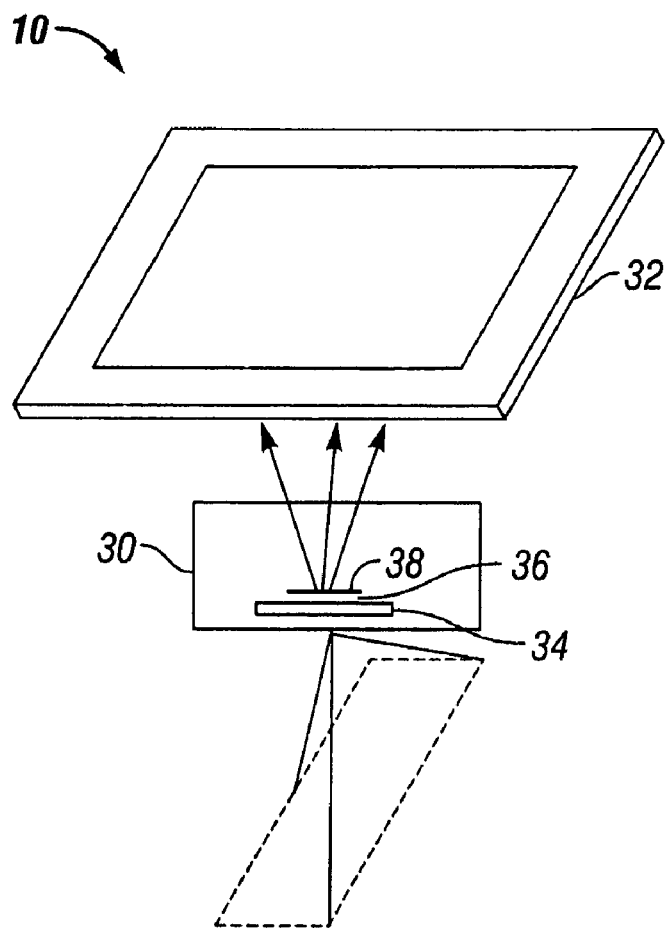
FIG. 2 depicts a remote sensor device of the system of the present invention.

The remote sensor device 10 is mounted to the aircraft and generally includes an optical system 30 and a detector 32 as shown in FIG. 2. The remote sensor device can be mounted on a cargo door, in a hole in the floor of the aircraft, under the nose or wing of the plane, or in a pod that is attached beneath the aircraft. The optical system 30 can include a lens 34, an aperture 36 and filter 38 to redirect or focus the energy onto the detector 32. The detector 32 senses energy and generates an emission of electrons that are collected and counted as a signal. The signal is carried to computer 12 that outputs a signal that is used in making images or is analyzed by a computer program. The magnitude of the output signal is proportional to the intensity of the sensed energy. Therefore, changes in the output signal can be used to measure changes in sensed energy during a given time interval.

The remote sensor device 10 can either be a passive or active sensor device. In a passive sensor device, energy comes from an external source. In contrast, an active sensor device generates energy within the sensor system, beams the energy outward, and the fraction of energy returned is measured. In addition, the remote sensor device can be either an imaging or non-imaging device. Imaging devices use the measured energy related to a specific point in the target area to excite a substance, like silver in film, or to drive an image-producing device like a monitor, to produce an image or a display. Non-imaging devices measure the energy from all points in the target area to generate an electrical strength signal.

In one preferred embodiment, the remote sensor device 10 includes a charge-coupled device or CCD. CCD is an extremely small, silicon chip that is light sensitive. When energy strikes a CCD, electronic charges develop whose magnitudes are proportional to the intensity of the impinging energy during a short time interval (exposure time). The number of detector elements per unit length, along with the optical system, determines the spatial resolution. Using integrated circuits, each linear array is sampled very rapidly in sequence to produce an electrical signal that varies with the radiation striking the array. This changing signal recording goes through a signal processor then to a recorder, and finally, is used to drive an electro-optical device to make a black and white image. After the instrument samples the data, the array discharges electronically fast enough to allow the next incoming radiation to be detected independently. Filters can be selected for wavelength intervals, each associated with a CCD array, in order to obtain multi-band sensing if desired.

In another embodiment, the remote sensor device includes a 3-dimensional sensor device such as LIDAR. LIDAR is similar to the more familiar radar, and can be thought of as laser radar. In radar, radio waves are transmitted into the atmosphere that scatters some of the energy back to the radar's receiver. LIDAR also transmits and receives electromagnetic radiation, but at a higher frequency since it operates in the ultraviolet, visible and infrared region of the electromagnetic spectrum. In operation, LIDAR transmits light out to a target area. The transmitted light interacts with and is changed by the target area. Some of this light is reflected/scattered back to the LIDAR instrument where it can be analyzed. The change in the properties of the light enables some property of the target area to be determined. The time for the light to travel out to the target area and back to LIDAR device is used to determine the range to the target.

There are presently three basic types of LIDAR: Range finders, Differential Absorption LIDAR (DIAL) and Doppler LIDAR. Range finder LIDAR is the simplest LIDAR and is used to measure the distance from the LIDAR device to a solid or hard target. DIAL LIDAR is used to measure chemical concentrations (such as ozone, water vapor, pollutants) in the atmosphere. A DIAL LIDAR uses two different laser wavelengths that are selected so that one of the wavelengths is absorbed by the molecule of interest while the other wavelength is not. The difference in intensity of the two return signals can be used to deduce the concentration of the molecule being investigated. Doppler LIDAR is used to measure the velocity of a target. When the light transmitted from the LIDAR hits a target moving towards or away from the LIDAR, the wavelength of the light reflected/scattered off the target will be changed slightly. This is known as a Doppler-shift and therefore Doppler LIDAR. If the target is moving away from the LIDAR, the return light will have a longer wavelength (sometimes referred to as a red shift), if moving towards the LIDAR the return light will be at a shorter wavelength (blue shifted). The target can be either a hard target or an atmospheric target (e.g. microscopic dust and aerosol particles that are carried by the wind.

Figure 3:
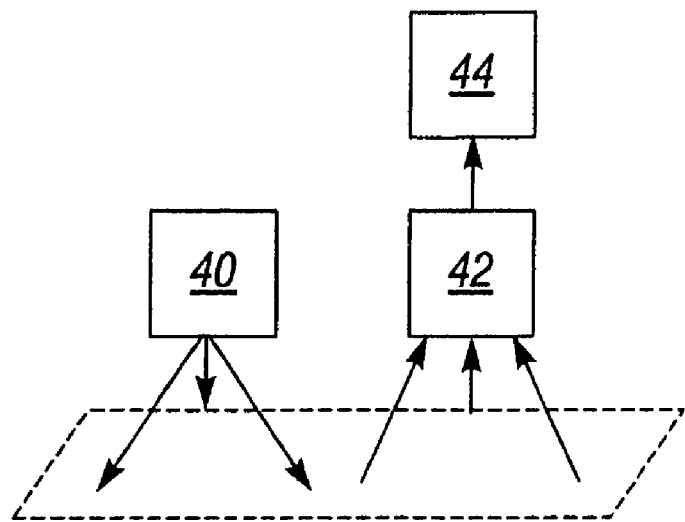
FIG. 3 depicts a simplified block diagram of a LIDAR remote sensor device in the preferred embodiment of the invention.

A simplified block diagram of LIDAR is shown in FIG. 3 and includes a transmitter 40, a receiver 42 and a detector 44. The transmitter 40 is a laser, while its receiver 42 is an optical telescope. Different kinds of lasers are used depending on the power and wavelength required. The laser may be both a continuous wave or pulsed. Gain mediums for the lasers include, gases (e.g. Helium Neon or Xenon Fluoride), solid-state diodes, dyes and crystals (e.g. Neodymium:Yttrium Aluminum Garnet). The receiver 42 records the scattered light received by the receiver at fixed time intervals. Detector 44 is usually an extremely sensitive detector such as photo-multiplier tubes that can detect backscattered light. Photo-multiplier tubes first convert the individual quanta of light/photons into electric currents that are subsequently turned into digital photocounts that can be stored and processed on a computer. The photocounts received are recorded for fixed time intervals during the return pulse. The times are then converted to heights called range bins since the speed of light is well known. The range-gated photocounts can then be stored and analyzed by a computer.

Computer 12 can comprise an industry standard model PCI single board computer using a processor and having board slots to handle the I/O functions performed by the board. The IP boards can provide analog-to-digital, digital-to-analog and discrete digital I/O functions. The IP boards are adapted to receive and store data from remote sensor device 10, attitude sensing device 16 and positioning device 14. In addition, computer 12 is adapted to perform stereo imaging techniques on collected data from the target area in order to calibrate remote sensor device 10.

Positioning device 14 can include a kinematic, post-processed GPS unit, the unit comprising a GPS system antenna connected to a GPS receiver that is part of computer 12. The GPS receiver periodically generates a set of geophysical coordinate and velocity data representative of the position of remote sensor device 10. The set of geophysical coordinate data and velocity data can be directed to computer 12 for processing and storing.

Attitude sensing device 16 can include an inertial measurement unit (IMU) to provide attitude data to computer 12 that is representative of a set of measured angles. The IMU generally senses change in velocity and rotation rate of the aircraft or remote sensor device, depending on where it is attached, in three coordinate axes. The IMU data obtained is used to determine the roll angle, the pitch angle and yaw angle.

A memory unit 18 can also be connected to computer 12 to store remote sensing data and geographic data. Memory unit 18 contains sufficient storage volume to store and transfer remote sensing data and geographic data for the system.

The navigation guidance system 20 can include a display console that presents to the pilot the current aircraft position relative to the planned flight lines in the target area of interest. A cross-hair can also be displayed to show whether the aircraft is staying on line at the planned altitude.

The method of the present invention provides a method of calibrating a remote sensing system employed in an aircraft or other vehicle using remote sensing data collected during conventional operation. The method includes mounting at least one remote sensor 10 on a vehicle and moving the vehicle in a self-locking pattern 46 over a target area 58. The movement may comprise any pattern that produces at least three substantially parallel travel lines out of a group of three or more lines. Further, at least one of the travel lines should be in an opposing direction to the other substantially parallel travel lines. In other words, out of any group of travel lines, some of which may not be parallel, at least three of the travel lines are parallel. Further, in the most preferred embodiment of the invention, the travel lines are parallel. In one preferred embodiment of the invention, the travel pattern comprises at least one pair of parallel travel lines in a matching direction and at least one pair of travel lines in an opposing direction.

Swath widths 59, as described below, are generated for each substantially parallel travel line with the remote sensor device. Remote sensing data is collected from the target area during vehicle movement, which is inputted into a computer 12 to calculate calibration data. The calibration data is applied to the remote sensing data to remove bias in image output. The vehicle used in the present invention may be an airplane, helicopter, satellite, truck or other transport device.

Figure 4:
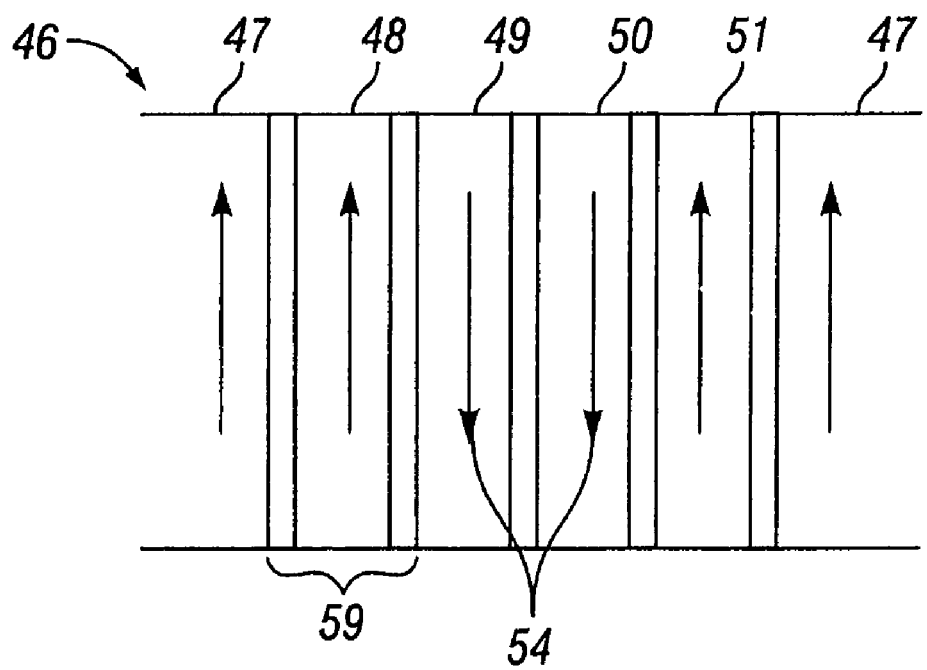
FIG. 4 depicts a self-locking flight pattern of a preferred embodiment of the present invention.

The preferred method of the present invention utilizes an aircraft 61 and a self-locking flight pattern 46 that includes a number of flight lines that are used to obtain the images from the target area as described in FIG. 4. The number of flight lines required to cover a target area can vary depending on the area of interest. It is not always possible or required to have an even number of flight lines. The pattern over the target area includes pairs of adjacent flight lines oriented so that one flight line is up and the other flight line is down or both flight lines are oriented in the same direction. Thus, any two adjacent flight lines can form a pair of flight lines in either an opposing or matching direction.

The self-locking flight pattern 46 as depicted in FIG. 4 can further include right and left outermost flight lines 47 with a number of inner parallel flight lines 48–51. The flight lines 47–51 can be divided into pairs of adjacent flight lines in a way so that both flight lines of each pair are in the same direction to form a double-up double down pattern. For example, pair 54 including flight lines 49 and 50 is in the opposite direction to its neighboring pair of flight lines including flight lines 47 and 48 and flight lines 47 and 51. The self-locking flight pattern 46 allows each flight line in the pattern to have one adjacent flight line oriented in the same or matching direction and the other adjacent flight line to be in an opposite crossing direction over the target area. However, the right and left outermost flight lines 47 are not part of the target area of interest but provide uniformity for the inner flight lines and therefore have only one inner adjacent flight line.

As the remote sensor device 10 moves along the self-locking flight pattern 46, it gathers data. In doing so, it generates swath widths 59 where the remote sensor device 10 scans a path covering an area to the sides of a flight line. Because each flight line is parallel to one another, these swath widths 59 overlap. These overlapping swath width areas can be used to calibrate remote sensor device 10 by along-track and cross-track parallax of images in adjacent flight lines with stereo imaging techniques as will be described below. The swath widths 59 are determined by the remote sensor device's field of view and can be varied as desired to obtain the optimum width for use in this method.

Figure 5:
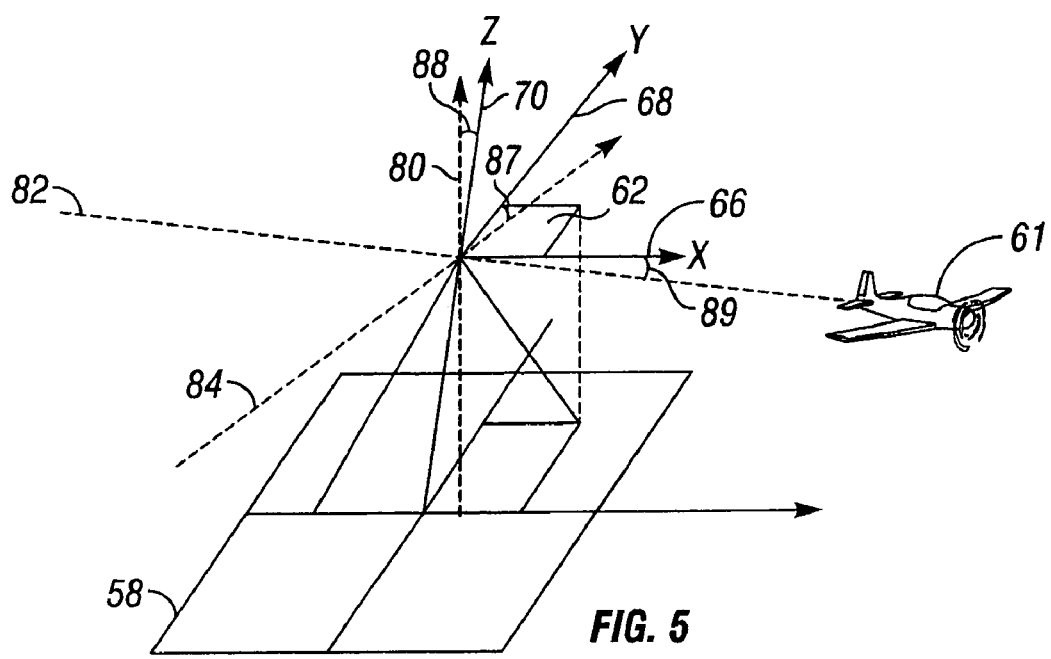
FIG. 5 depicts a three-axis coordinate system of the present invention.
Figure 6:
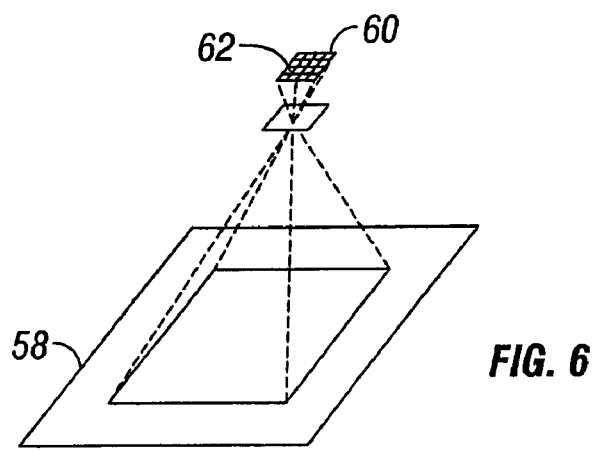
FIG. 6 depicts an image plane of the target area of the present invention.
Figure 7:
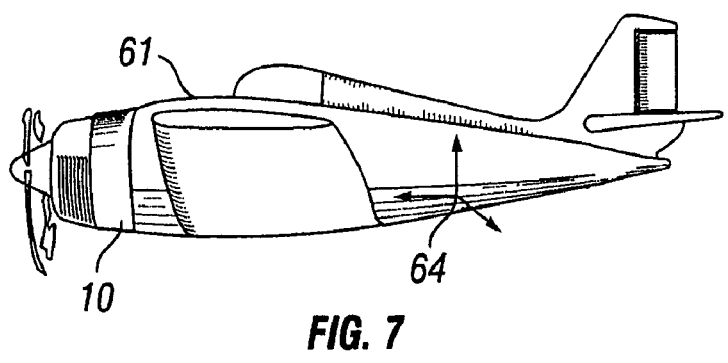
FIG. 7 depicts a remote sensor device attached to a moving aircraft.

As depicted in FIGS. 5, 6 and 7, the remote sensor device 10 can be mounted onto aircraft 61 such that a portion of target area 58 is imaged onto a two-dimensional array 60 whose linear axis defines an image plane 62. An image coordinate system 64 of image plane 62 consists of a forward axis 66 or "x"-axis, a "y"-axis 68 and a "z"-axis 70 having an origin located at the center of array 60. The x-axis 66 is the axis parallel to a linear axis of array 60 and is in the same general direction of the forward flight motion. The y-axis 68 lies on image plane 62 and is perpendicular to x-axis 66 while the z-axis 70 is perpendicular to image plane 62.

The set of three world axes include a vertical axis 80, a forward flight axis 82 and a cross-track axis 84. The vertical axis 80 is defined by gravity, the forward flight axis 82 is the vector projection of an instantaneous velocity of aircraft 61 in the x-y plane of the image coordinate system 64, the cross-track axis 84 is defined by a cross-section between the y-z plane of the image coordinate system 64 and a horizontal plane perpendicular to the vertical axis 80. The three attitude parameters are a roll angle 87 (omega), a pitch angle 88 (phi), and a yaw angle 89 (kappa). The pitch angle 88 is the angle between the x-axis 66 of the image plane 62 and a horizontal axis perpendicular to the vertical axis 80 and lies in the x-z plane of the image coordinate system 64. The roll angle 87 is the angle between the y-axis 68 of the image plane 62 and the cross-track axis 84; while the yaw angle 89 is the angle between the x-axis 66 of the image plane 62 and the forward flight axis 82.

For an active sensor such as LIDAR, light pulses are emitted and their reflected signals captured. The position of the reflecting object is determined by the angles of the incoming light signals and the travel time (i.e. the time when a pulse is generated until an echo is received). However, this time can be biased by propagation delay internal to the LIDAR device. If this delay were not considered, the range (i.e. the distance from the LIDAR device to the reflecting object) would be over-estimated. The range offset, computed by multiplying the propagational delay with the speed of light, must be calibrated to remove this bias.

Additionally, during operation the IMU unit constantly records the attitude of its own reference plane. However, this plane does not coincide with image plane 62 whose attitude parameters are required to process sensor data. The boresight angles are the angles such that a series of rotations based on such angles will make the image plane coincide with the IMU reference plane. By convention, the order of rotations is roll, pitch and yaw. Once the roll, pitch and yaw angles are determined, the attitude of the image plane is readily available by combining the attitude of the IMU reference plane with these angles.

In one embodiment, the method of the present invention uses a 3-dimensional remote sensor device. Although a 3-dimensional remote sensor device is used in this embodiment, a 2-dimensional device can also be used in the calibration method of the present invention.

First, the data are processed using an initial set of assumed roll, pitch and yaw angles that can be obtained from prior calibrations or simply set to zeroes if no calibration data are available. As a result of processing with bias, objects in images will be shifted from their true geographical locations. Using the algorithms described below, a new set of roll, pitch and yaw angles are derived. The process is then iterated until the values converge. Usually, only two or three iterations are required.

The yaw and pitch angles are determined from along-track parallax ("x" parallax) of objects in the overlapping swath width areas of adjacent flight lines. The yaw angle is determined using pairs of adjacent flight lines oriented in the same direction or matching pairs. The pitch angle in contrast is determined using pairs of adjacent flight lines going in opposite directions or crossing pairs.

The roll angle and the range offset in comparison are determined using cross-track parallax ("y" parallax) of objects in the overlapping swath width areas of adjacent flight lines. The roll angle is determined using crossing pairs of adjacent flight lines, whereas the range offset is determined by matching pairs of adjacent flight lines.

Figure 8:
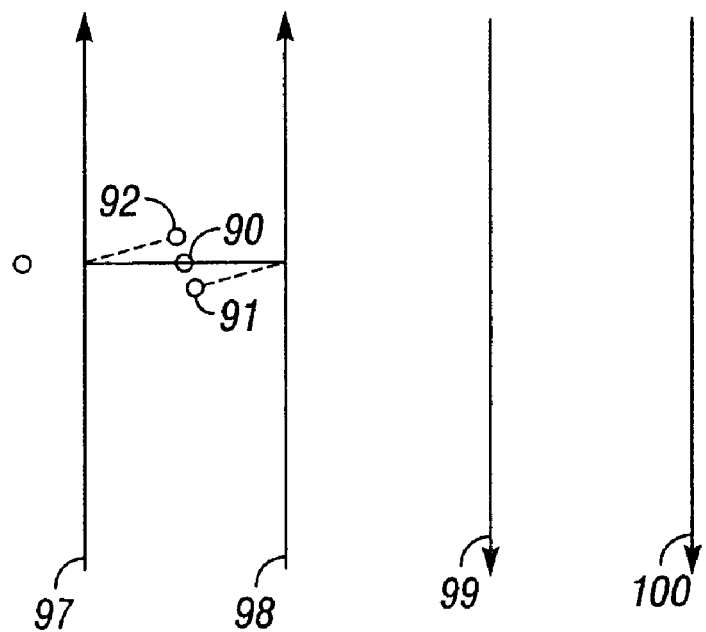
FIG. 8 depicts a self-locking flight pattern used to calculate the yaw angle.

Because of the yaw bias, which is a rotation about the z-axis, objects are rotated about the center of the image plane. In FIG. 8, assuming there is a counter-clockwise bias, images rotate clockwise. For example, if the flight direction is up, object 90 in FIG. 8 in the overlapping swath width area is shifted forward to position 91 during flight line 97. In comparison, object 90 in the overlapping swath width area is shifted backward to position 92 during flight line 98 since object 90 is to the left of flight line 98. If d is the along-track parallax ("x" parallax) of a point with a positive value, meaning a forward displacement for objects to the right of a flight line and backward displacement for objects to the left, and if a positive yaw angle is one where the image plane has to be rotated counter clockwise to coincide with the IMU reference plane, for objects located in the overlapping swath width areas and for small yaw angles (which is almost always the case), the following formula holds true:

$$d = AO * \sin(\text{yaw angle}) * 2$$

where: A=the midpoint of the line segment connecting 91 and 92

O=the nadir point

Conversely, if d and AO can be measured, then the yaw angle can be determined by:

$$\text{yaw angle} = \arcsin[(d/2)/(AO)]$$

The overlapping swath width area for each matching pair of flight lines of the flight pattern is compared in determining the yaw angle. The yaw angle can be computed for each object in the overlapping swath width area of the matching pair of flight lines then averaged to yield the yaw angle for the matching pair of flight lines. The yaw angles of all matching pairs of flight lines are then averaged to yield the final yaw angle for the flight pattern. The matching of objects in the overlapping swath width areas can be performed either manually or automatically using pattern matching software.

Next, the pitch angle is determined. A pitch angle is a rotation about the y-axis. A positive pitch angle is defined to be one where the forward edge of the image plane is tilted upward. A pitch angle is computed in the present invention using crossing pairs of adjacent flight lines.

Figure 9:
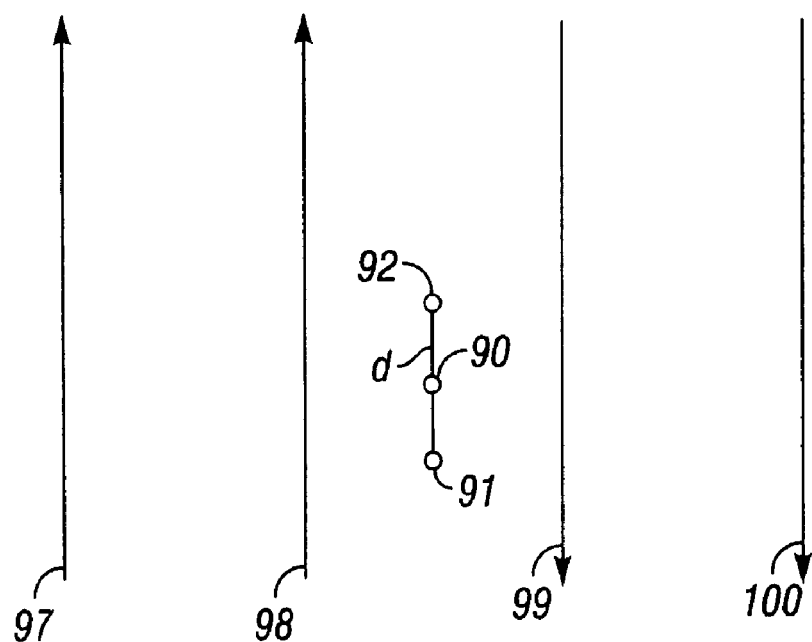
FIG. 9 depicts a self-locking flight pattern used to calculate the roll angle.

A pitch angle creates x parallax. A positive angle shifts object images backward in the final output image. Consider the pair of crossing flight lines 98 and 99 in FIG. 9. Assuming there is a positive pitch, object 90 in the overlapping swath width area during flight line 98 is shifted backward to 91 while during flight line 99, it is shifted backward to 92. Since the flight lines are in an opposite crossing direction, the shift in position of objects in the overlapping swath width area will also be in opposite directions creating the x parallax. If h is the altitude above ground of the center of the image plane, and d is the x parallax (i.e. line segment connecting 91 and 92), the pitch angle can be determined by:

pitch angle=arctan [(d/2)/h]

where: d is positive if the vector 9192 points in the same direction as flight line 98

Flight GPS data and general elevation data for the area of interest (such as by using United States Geographical Survey data) can be used in determining h. The general elevation data for the target area of interest does not have to be exact for the algorithm of the present invention to function properly, and thus can be estimated.

The overlapping swath width area for each crossing pair of flight lines of the flight pattern is compared in determining the pitch angle. The pitch angle is computed for each object in the overlapping swath width area of the crossing pair of flight lines then averaged to yield the pitch angle for the crossing pair of flight lines. The pitch angles of all crossing pairs of flight lines are then averaged to yield the final pitch angle for the flight pattern.

Note that the yaw angle causes approximately the same along-track shift in the same direction in both flight lines of a crossing pair. Therefore, the yaw angle does not effect the determination of the pitch angle.

Figure 10:
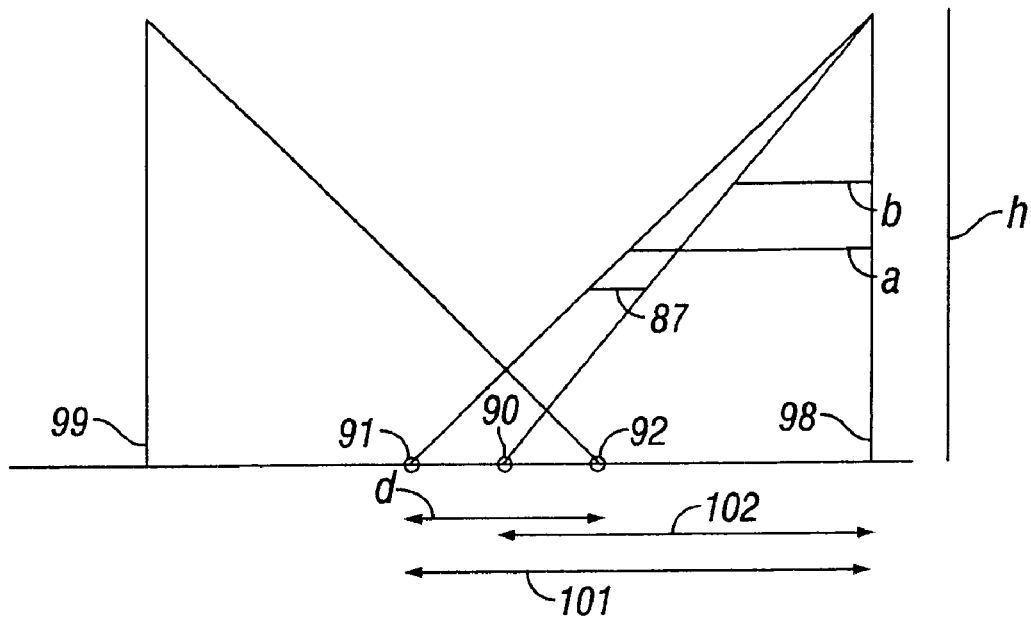
FIG. 10 depicts a self-locking flight pattern used to calculate the pitch angle.

Next the roll angle is computed using crossing pairs of flight lines. The roll angle is a rotation about the x-axis, the axis that is in the direction of flight. A positive roll angle is one where the image plane is tilted downward to the right, causing objects in the final output image to be shifted to the right. Considering crossing flight lines 98 and 99 in FIG. 10 having an object 90 in the overlapping swath width area, and assuming that there is a positive roll, object 90 during flight line 98 will be shifted to the right to position 91 while during flight line 99, object 90 will be shifted to position 92. Since flight lines 98 and 99 are in opposite direction, the shifts for each flight line will also be in opposite directions creating a separation between 91 and 92 in the cross-track direction, or y parallax. If d is the separation between 91 and 92 (or the y parallax), the following sign convention is used:

(i) d is positive (+) if 91 is farther from flight line 98 than 92 is from flight line 99 (in other words, the points 91 and 92 cross over each other);

(ii) d is negative (−) if 91 is closer to flight line 98 than 92 is from flight line 99;

The roll angle can then be computed by determining an angle that would minimize the expression:

Σ(d−dr)² where: dr=the displacement caused by the roll angle

Using the least square error theory, dr is equal to the average value of d.

$$dr = d_{ave} = \frac{1}{n}\sum_{i=1}^{n} d_i$$

where: n=number of matching objects in the overlapped area

If h is again the altitude above ground of the center of the image plane, a roll angle 87 that would effect the cross-track adjustment $d_{ave}$ can be approximated by (note that each flight line contributes half of the adjustment):

tan(roll angle)=tan(a−b)=(tan(a)−tan(b))/(1+tan(a)*tan(b))

where: tan (a)=101/h
tan (b)=102/h

The overlapping swath width area for each crossing pair of flight lines of the flight pattern is compared in determining the roll angle. The roll angle is computed for each object in the overlapping swath width area of the crossing pair of flight lines then averaged to yield the roll angle for the crossing pair of flight lines. The roll angles of all crossing pairs of flight lines are then averaged to yield the final roll angle for the flight pattern.

The range offset can then next be computed. The range offset, like the roll angle, can also be determined by cross-track parallax of objects in the overlapping swath width areas. However, the range offset is determined using matching pairs of flight lines. Because the roll angle effects the same parallax shift for both flight lines of a matching pair it therefore does not effect the computation of the range offset.

Figure 11:
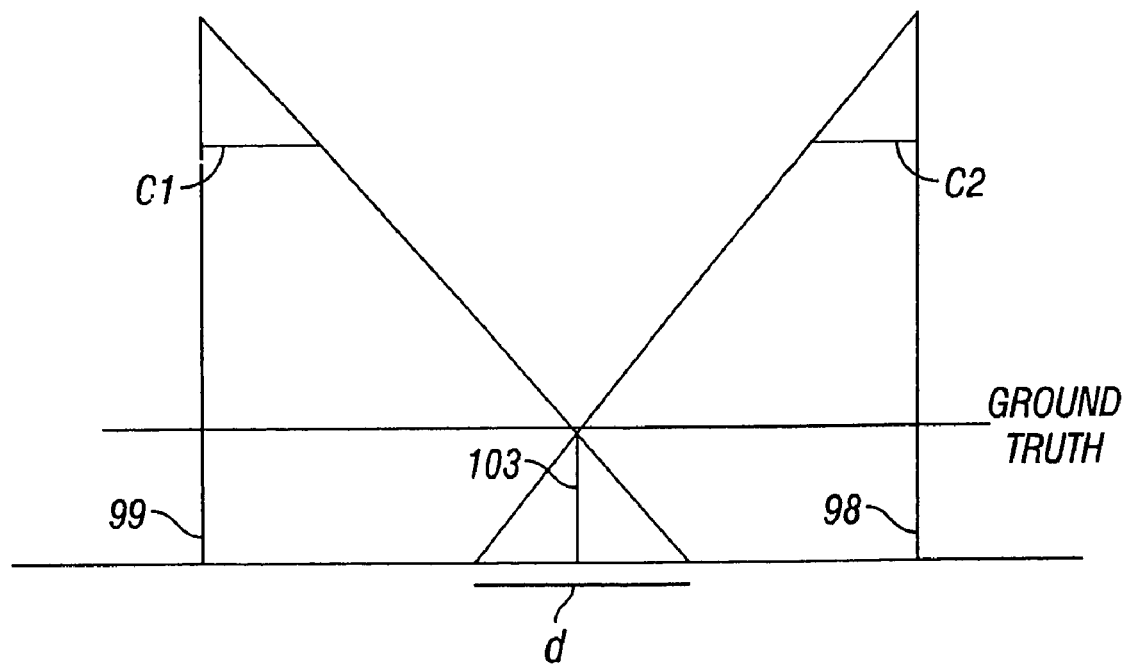
FIG. 11 depicts a self-locking flight pattern used to calculate the range offset.

The range offset is a characteristic of an active sensor, such as LIDAR. It causes objects to appear below ground truth, causing positive y parallax. The range offset 103, as depicted in FIG. 11, can be approximated by:

Range offset=((d/2)/tan(c))

where: c is the average incident angle (c1+c2)/2

Once the yaw, pitch and roll angles and the range offset are determined, they can be applied to remove the bias in the final image output.

In another embodiment, the method above further includes determining an estimated horizontal displacement error and an estimated vertical displacement error of the remote sensing system. When two adjacent parallel flight lines are overlaid on one another, a first object having ground height may not be at the same position in the overlapping swath width area due to a horizontal displacement error ($E_h$). By measuring the parallax of the first object in the overlapping swath width area, $E_h$ for the first object can be determined by:

$E_h$ of first object=(measured distance)/2

$E_h$ of the remaining objects in this overlapping swath width area as well as other overlapping swath width areas are also determined in a similar fashion and an estimated horizontal displacement error is computed by taking the standard deviation of the $E_h$ values.

The estimated vertical displacement error is based on the y parallax of objects in an overlapping swath width area of matching pairs of flight lines. A range offset error causes the data to be below ground truth and the images to be moved away from their respective swath centerline. Therefore, an overlapping swath width area can be used to determine a vertical displacement error for a first object having a discrepancy between the ground truth and its data values using the stereo imaging technique. The estimated vertical error for the remote sensing system is then determined by computing the standard deviation of a sampling of vertical displacement errors for the same number of objects in each flight line such that the objects are spread evenly along each flight line.

Although various embodiments of the present invention have been described in detail above, it should be appreciated that the present invention provides many applicable inventive concepts that can be embodied in a wide variety of specific contexts. The specific embodiments discussed herein are merely illustrative of specific ways to make and use the invention, and do not delimit the scope of the invention.

What is claimed is:

1. A method of calibrating a remote sensor system comprising the steps of:
    (a) mounting at least one remote sensor on a vehicle;
    (b) moving the vehicle in a self-locking pattern over a target area to calibrate the remote sensor, the movement comprising any pattern that produces at least three substantially parallel travel lines out of a group of three or more lines, at least one of which travel lines is in an opposing direction to the other substantially parallel travel lines;
    (c) generating swath widths for each substantially parallel travel line with the remote sensor device;
    (d) collecting remote sensing data of the target area during vehicle movement;
    (e) inputting the remote sensing data into a computer to calculate calibration data; and
    (f) applying the calibration data to the remote sensing data to remove bias in a displayable image output or in an electrical strength signal.

2. The method of claim 1, wherein the vehicle is an aircraft.

3. The method of claim 1, wherein the vehicle is a satellite.

4. The method of claim 2, wherein the travel pattern comprises at least one pair of parallel flight lines in a matching direction and at least one pair of parallel flight lines in an opposing direction.

5. The method of claim 2 wherein the remote sensor device is LIDAR.

6. The method of claim 1 wherein the yaw angle is calculated using the overlapping swath width areas of pairs of travel lines having matching direction.

7. The method of claim 1 wherein the pitch angle is calculated using the overlapping swath width areas of pairs of travel lines having opposing direction.

8. The method of claim 1 wherein the range offset is calculated using the overlapping swath width areas of pairs of travel lines having matching direction.

9. The method of claim 1 wherein the roll angle is calculated using the overlapping swath width areas of pairs of flight lines having crossing direction.

10. The method of claim 1 wherein the remote sensor device is CCD.

11. A method of calibrating a remote sensor system for use in airborne imaging comprising the steps of:
    (a) mounting at least one remote sensor device on an aircraft;
    (b) flying the aircraft in a self-locking flying pattern over a target area to calibrate the remote sensor, the self-locking flying pattern comprising any pattern that produces at least three substantially parallel flight lines out of a group of three or more lines, at least one of which flight lines is in an opposing direction to the other substantially parallel flight lines;
    (c) generating swath widths between the adjacent substantially parallel flight lines with the remote sensor device such that the adjacent substantially parallel flight lines produce at least one overlapping swath width area;
    (d) collecting remote sensing data of the target area in-flight;
    (e) inputting the remote sensing data into a computer to calculate a yaw angle, a pitch angle, a range offset, and a roll angle; and
    (f) applying the yaw angle, the pitch angle, the range offset, and the roll angle to remove bias in a displayable image output or in an electrical strength signal.

12. The method of claim 11 wherein the flight lines are parallel.

13. The method of claim 11 wherein the self-locking flying pattern includes at least one pair of flight lines in a matching direction and at least one pair of flight lines in an opposing direction.

14. The method of claim 11 wherein the remote sensor device is LIDAR.

15. The method of claim 11 wherein the yaw angle is calculated using the overlapping swath width areas of pairs of flight lines having matching direction.

16. The method of claim 11 wherein the pitch angle is calculated using the overlapping swath width areas of pairs of flight lines having crossing direction.

17. The method of claim 11 wherein the range offset is calculated using the overlapping swath width areas of pairs of flight lines having matching direction.

18. The method of claim 11 wherein the roll angle is calculated using the overlapping swath width areas of pairs of flight lines having crossing direction.

19. A method of calibrating a remote sensor system for use in airborne imaging comprising the steps of:
    (a) mounting at least one remote sensor device on an aircraft;
    (b) flying the aircraft in a self-locking flying pattern over a target area to calibrate the remote sensor, the self-locking flying pattern comprising adjacent substantially parallel flight lines having a right outermost flight line, a left outermost flight line and at least one inner flight line, the adjacent substantially parallel flights lines arranged so that the self-locking flying pattern has at least one pair of adjacent substantially parallel flight lines in a matching direction and at least one pair of adjacent substantially parallel flight lines in a opposing direction;
    (c) generating swath widths between the adjacent substantially parallel flight lines with the remote sensor device such that adjacent flight lines produce overlapping swath width areas;
    (d) collecting remote sensing data of the target area in-flight;
    (e) inputting the data images into a computer to calculate a yaw angle, a pitch angle, and a roll angle; and
    (f) applying the yaw angle, the pitch angle, and the roll angle to remove bias in a displayable image output or in an electrical strength signal.

20. The method of claim 19 wherein the flight lines are parallel.

21. The method of claim 19 wherein the yaw angle is calculated using the overlapping swath width areas of pairs of adjacent substantially parallel flight lines having matching direction.

22. The method of claim 19 wherein the pitch angle is calculated using the overlapping swath width areas of pairs of adjacent substantially parallel flight lines having crossing direction.

23. The method of claim 19 wherein the roll angle is calculated using the overlapping swath width areas of pairs of adjacent substantially parallel flight lines having crossing direction.

24. A method of determining error in a remote sensing system for airborne imaging comprising the steps of:
 (a) mounting at least one remote sensor device on an aircraft;
 (b) flying the aircraft in a self-locking flying pattern over a target area to calibrate the remote sensor, the self-locking flying pattern comprising adjacent substantially parallel flight lines arranged so that the self-locking flying pattern includes at least one pair of flight lines in a matching direction and at least one pair of flight lines in an opposing direction;
 (c) generating overlapping swath widths areas between the adjacent substantially parallel flight lines with the remote sensor device;
 (d) collecting remote sensing data of the target area in-flight;
 (e) inputting the remote sensing data into a computer to generate an estimated horizontal displacement error and an estimated vertical displacement error using the swath widths; and
 (f) applying the horizontal displacement error and vertical displacement error to the remote sensing data to reduce the error in a displayable image output or in an electrical strength signal.

* * * * *